UNITED STATES PATENT OFFICE.

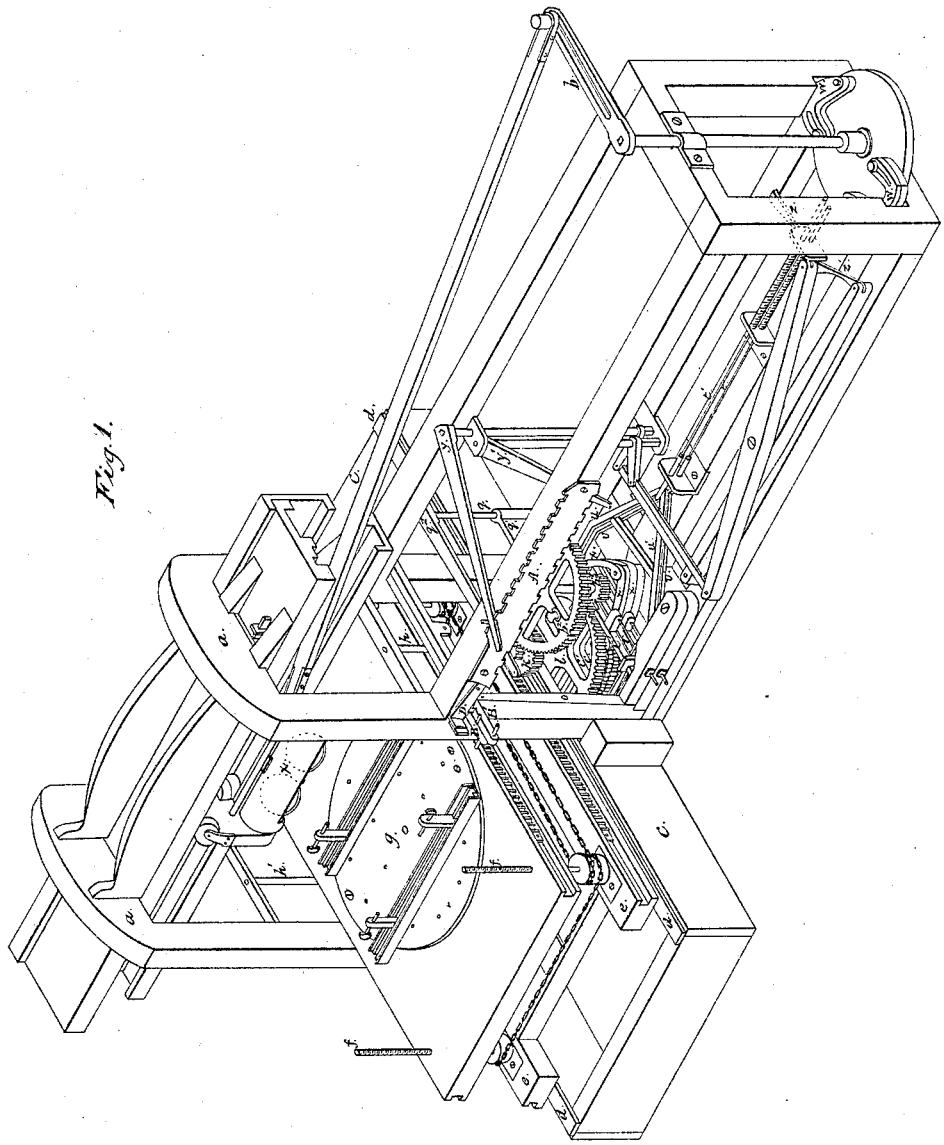

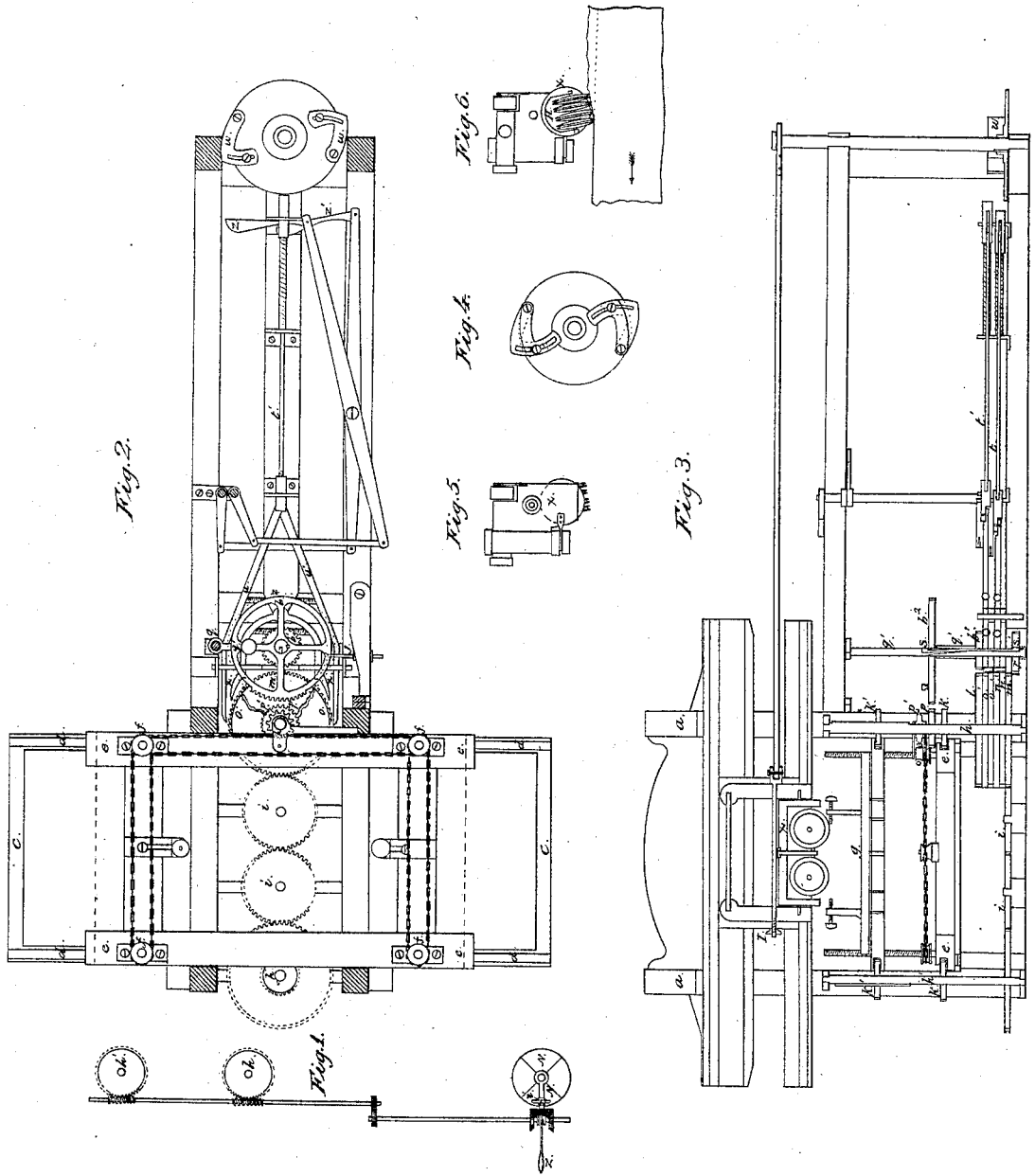

CHARLES WILSON, OF SPRINGFIELD, MASSACHUSETTS.

MACHINE FOR DRESSING STONE.

Specification of Letters Patent No. 6,287, dated April 10, 1849.

*To all whom it may concern:*

Be it known that I, CHARLES WILSON, of Springfield, in the county of Hampden and State of Massachusetts, have invented a Machine for Dressing Stone; and I do hereby declare the following to be a full, clear, and exact description of the same, reference being had to the annexed drawings, making a part of this specification, in which—

Figure 1 is a perspective view; Fig. 2 is a plan; Fig. 3 is a longitudinal section; Fig. 4 is a plan of the cams on the main shaft; Figs. 5 and 6 are detached views of the cutters; Fig. 7 is a view of some shafting and connections, which may be substituted for other parts.

The annexed description relates to a machine I have invented for dressing stone by means of a system of revolving cutters, a patent for which was granted to me by the United States, the thirteenth day of March, 1847. In that patent I have illustrated the method of using my cutters, by causing them to act on the surface of a grindstone while in rotation, and have referred to other means, such as causing the stone to vibrate beneath the cutters or the cutters to vibrate or pass back and forth over the stone, &c.

In the use of the cutters there are many things to be considered in order to its successful working so that I was compelled to invent a machine especially adapted to the purpose. In this machine it is true, that I use few if any mechanical contrivances new, but I have made combinations of these, for regulating the motion of the stone, so as to cause it to traverse in such directions, as will receive the best action of the cutters; with means for regulation and adjustments, so as to adapt different kinds of material to the action of the cutters; to regulate the speed of the stone, the pressure of the cutters upon it &c. In order to accomplish these several things I suspend the cutters beneath a strong frame ($a$, $a$,) in such a manner that they can be made to traverse back and forth in a carriage sliding or rolling in a system of grooves, connected with the frame ($a$) the propulsion of the carriage being effected by the crank ($b$) attached to the main shaft. Beneath the framing and cutters I construct a peculiar movable staging; on which to place the materials to be acted upon by the cutters. ($c$ $c$) represent a solid oblong square foundation placed between the upright of the frame ($a$ $a$) having on its two longer sides a rail way ($d$, $d$,). The staging has two motions, one by which it can be elevated, and depressed, and one, which is vibrating, or sliding. At ($e$, $e$) is a frame resting upon the rail ($d$); on each of its sides there are racks, by means of which the frame is propelled from end to end, of the base ($c$). Above this there is the floor of the stage; this consists of a strong framing, similar in dimensions to the one below. It is supported at each corner, upon screw rods ($f$ $f$ $f$ $f$) standing vertically, their lower ends resting in sockets upon the frame ($e$). By means of these screws (which are all made to turn in unison by the chains and pulleys, shown in the figure, or by bevel wheels and shaftings) the floor of the stage is raised or lowered. There is a rack upon each side of the floor, similar to the rack upon ($e$) a second pinion placed upon the same shaft with that which operates the first rack, operates this also; this second pinion however, slides up and down; the shaft upon a feather, in order to accommodate itself to the various elevations of the floor.

In the center of the floor there is a revolving circular plate (5) with four gripping standards upon it, this is the place on which the stone is secured, while being dressed.

The stage is made to traverse back and forth upon rails ($d$); by means of a system of gearing, pawls, and ratchet wheels; so that the attendant is able to produce a variety of movements, for accelerating or diminishing the speed, increasing or diminishing the pressure of the cutter wheels, and in regulating the raising and lowering of the floor of the stage.

The letters ($h$) and ($h'$) represent two vertical shafts, erected midway between the corner posts of the frame ($a$), and on each side of the stage; the shaft ($h'$) is attached to the shaft ($h$) by a system of wheels lying beneath the stage, as seen in the ground plan Fig. 2; represented by the letters ($i$ $i$). The shaft ($h'$), serves simply to counterbalance the action of the shaft ($h$), so as to cause an equal force to be expended on each side of the stage in moving it along. There are likewise two pinions upon each shaft, to match; those represented at ($k$ $k$) are permanently fixed to the shaft, while ($k'$ $k'$) are permitted to slide up and down, but must rotate with the shaft, a feather being introduced upon it for that purpose. The fixed pinions ($k$ $k$) work in the rack upon the side of the lower frame of the stage ($e$ $e$) while the pinions ($k'$ $k'$) working in the racks upon the stage floor are permitted to adapt themselves to its varying position, by sliding up and down as before mentioned.

Upon the shaft $(h)$ near its lower end, there are two large spur wheels, $(l)$ and $(m)$, seen in section Fig. 3, and between these are four ratchet wheels $(n)$ and $(n')$ and $(o)$ and $(o')$. The ratchet wheels $(n\ n')$ together with the spur wheel, $(m)$, are fixed permanently to the shaft $(h)$, while the ratchet wheels $(o\ o')$ and spur wheel $(l)$, play loosely upon the shaft $(h)$, but are firmly attached together, and revolve in one mass. The ratchet wheels are operated upon by pawls and give motion to the spur wheels to which they are attached, the object of having two ratchet wheels to each spur wheel is, for reversing the motion: the teeth of the ratchet $(n)$ being pointed in a contrary direction from those of $(n')$, and likewise those of $(o)$ in a contrary direction from those of $(o')$ as seen in Figs. 1 and 2.

The ratchet wheels $(n\ n')$ give motion to the shafts $(h\ h')$, the ratchet wheels $(o\ o')$ give motion to the chains for raising or lowering the floor $(g)$; in order that they may be enabled to do this, the wheel $(l)$ is put in gear with a pinion and spur wheel $(b'$ and $b^2)$ upon an independent shaft; $(q')$ thus connecting it with pinion $(p)$, revolving loosely upon shaft $(h)$.

The pinion $(p)$ is attached to the picker $(p')$ which is a small wheel with teeth formed upon its edge, suitable for working into the links of the chains; the shaft $(h)$, serving merely as the bearings for these two wheels $(p\ p')$ to run upon.

The wheels $(b'$ and $b^2)$ can be engaged or disengaged at pleasure; and for this purpose they are hung upon a shaft at $(q)$, which is set on one side of the frame, a broad arm $(q')$ extending from it to the axis of the pinion and wheel which stands in line with the shaft $(h)$, from the top of $(q)$ a lever $(q^2)$ stretches across to the opposite side of the frame, and is there held in position by one of two notches, seen in the figure which regulates the distance the lever must be moved for engaging or disengaging the wheels.

At $(r)$ Fig. 3 will be seen a pinion (in section) which is intended to operate upon the wheel $(m)$ but as shown is not in gear with it, but is a short distance below it. In order that the pinion $(r)$ may be put in gear, it is necessary that it should slide up and down upon the shaft upon which it is placed. This is effected by attaching it to a sliding rod, or feather, which is introduced in a hole bored lengthwise through the shaft and comes out through a slot made in the same at that part where the pinion $(r)$ is seen. This feather is seen at $(s$ and $s')$ at $(s')$ it is keyed to the pinion, and at $(s)$ it terminates in a hook which catches in a projection seen in the top of $(b^2)$. Beneath the pinion $(r)$ a spiral spring is placed on the shaft (as seen) which has its force directed to throw up the pinion—so that on disengaging the hook $(s)$ the pinion is thrown in gear with $(m)$—and may be again thrown out of gear by re-engaging $(s)$. The use of this set of engaging and disengaging wheels is as follows: In the first place, when $(b')$ is put in connection with $(l)$ and $(p,)$ in connection with $(b^2)$ they actuate the chains and screws which elevate $(s)$ or lower the floor $(g)$ of the stage; and by disconnecting the ratchet wheels from the pawls and using the crank pin, seen upon $(b^2)$ the floor $(g)$ can be raised or lowered by hand, in order to adjust the stone placed upon it, to some precise spot, $(b^2$ and $b')$ being then disengaged from $(l$ and $p)$ and the wheel $(r)$ put in gear with $(m)$ a connection is then formed for moving the stage by hand power, anywhere, back and forth upon its ways.

The next point I come to is to describe the method of operating the system of ratchet wheels; this is accomplished by two sets of double pawls, combined with two sets of back checks. The pawls proceed from shafts lying horizontally near the bottom of the frame, one over the other as seen at $(t\ t')$. The pawls resemble two long crooked fingers, hinged in the ends of the shafts as represented at $(u\ u')$ and $(v\ v')$; a spiral spring stretches across, and connects the fingers, so as to draw them together in order that they may press upon the sides of the ratchet wheels. Of the pawls: $(u)$ operates the ratchet wheel $(o')$, and $(u')$ operates $(o)$, $(v)$, operates $(n')$ and $(v')$ $(n)$. It will be seen now that the pawls give motion to the ratchet wheels according to the side they are in connection with, for they are adjusted and shifted from side to side as wanted. The shafts $(t\ t')$ are thrust forward by regulating cams, seen at $(w\ w)$ which revolve upon a plate, keyed on the main driving shaft, these cams strike the ends of the rods and cause them to push the pawls forward, and thus urge on the ratchet wheels: they are made to return by the force of the recoil spring, seen upon them. At $(x\ x)$ are two pairs of back catches to match the pawls, and work behind them in the ratchet wheels, for the purpose of preventing them from reacting, while the points of the pawls are being withdrawn for a new purchase.

The letters $(y\ y)$ are two levers which act through a system of connections on the rods, $(t\ t')$, and are for regulating the throw of the pawls, this is done by means of two keys $(z\ z')$ which play through slots, in and near the end of the rods $(t\ t)$. The manner in which they are reached by the levers $(y\ y')$ is plainly seen in the drawings. On a part of the frame there is a graduated plate (A) having a number of notches cut on each of its edges, these serve to hold the ends of the levers ($y$ $y'$) in several different positions, and it is by carrying the levers along this plate that the speed of the ratchet wheels is regulated, through the varying action of the pawls. The lever ($y$), regulates the speed of the lower set of pawls, and ($y'$) the upper set.

By passing the lever ($y'$) along the plate A we gradually draw the key ($z$) within the slot of ($t'$), and thus reduce the length of its vibrations, as it cannot fall back so far upon the inclined edge of the cams ($w$). And the pawls, consequently take up fewer teeth of the ratchet wheels. The throw of the pawls are thus gradually diminished, until the lever is placed as represented at ($y$), (the action of both levers in this respect being the same) when the key will be drawn in the slots in ($t'$), to the point of its greatest breadth, as seen at ($z'$); at which point all action ceases; the end of the rods ($t$ $t'$), being then clear of any contact with the cams ($w$), and of course no motion is produced.

The lever ($y$) regulates the speed of the two lower ratchet wheels ($n$ $n'$), and consequently the speed of the stone in moving along on the stage under the cutter wheels. As the levers ($y$ $y'$) are represented, the cams ($w$) would impart motion only to the upper set of ratchet wheels ($o$) or ($o'$), which are those for raising and lowering the stage floor, by means of the chains and screws ($f$). By bringing the lever ($y$) toward ($y'$) the lower set of ratchet wheels ($n$) or ($n'$) are set in motion and then carry the stone laterally back and forth under the cutters, thus the stone will be carried gradually along under the cutter wheels, and will be rising up at the same time; the respective speed each will have to the other, will be, as the respective positions of the levers ($y$) ($y'$). If the lever ($y$) is made to take the position of ($y'$) and ($y'$) the position of ($y$), then the stage would be traveling horizontally along, without raising the raising pawls receiving no motion from the cams. The cams ($w$) are also adjustable so as to regulate the throw of the rods ($t$ $t'$). To do this, the cams are each made of two pieces shaped as in the drawing, one end works on a center point, and the opposite which is crooked like arms, is adjusted and held in different positions by set screws working through them in the slot represented. In Fig. 4, this diversity of position is represented. The lower division of the cam giving a greater throw than the upper.

We now come to describe the method of changing the motion of the stage. When the stage has carried the stone upon it, so that its whole face or whatever portion is designed to go under the cutters, it must be returned, and also when the floor of the stage has been elevated to its full height, it must be made to descend. These movements are accomplished by simply changing the action of the pawls, from one side of the ratchet wheels to the other, and the mechanism for making the changes, is seen at (B B'). These consist of two slides, connected by levers to two other slides (C C') which lie across the foot of the frame immediately in front of the tier of wheels; these have holes, near each end, through which the fingers of the pawls pass loosely, so that there will be no impediment to their vibrating movements. By moving these slide pieces (C C'), a little either way, the pawls are carried with them, until their points on one side are removed from the ratchet wheels, and the opposite side lodged upon them. To fix these several positions permanently, three notches are cut in the slides (B B') either one of which, when combined with the clutch (D) will hold them in place. If the slides were moved along until (D) held them near the letters (B) the first represented the fingers ($u$) and ($v$) of the pawls would be put in gear.

If the slides were then drawn to the second or middle notch, shown in the drawing, as held by (D): the pawls would be wholly disengaged; if then further moved on, to the third notch (which is not seen), the fingers of the pawls ($u'$) and ($v'$) would be engaged. As the slides (B B') work independently of each other, so the pawls may be made to operate on contrary sides of the ratchet wheels, and thus revolve them in different directions; at the same time, or one set may be taken off, and the other allowed to work as occasion may require it.

The operation of the machine is as follows: A piece of stone is first placed upon the table ($g$) and held firmly in place by some proper device, such as set screws, or clamps; then, by means of the lever ($q^2$) set the wheel ($b^2$) in gear with the chains for elevating the floor or stage ($g$); then with the hand, actuating the wheel ($b^2$), raise or lower the stage ($g$), until the stone is at the right height to meet the cutter wheels, this done, disengage ($b^2$), and start the cutters in vibration, by applying the requisite power to the crank ($b$); next raise the proper clutch (D), and pull out the slide (B), until the third notch is set; this engages the pawl ($v'$) on the ratchet wheel ($n$) and sets the stage in motion by means of the gearing before described so that it will carry the stone under the cutters. The lever ($y$) is now moved along the graduated plate (A) in order to allow the end of the pawl shaft (*t*) to spring back and come in contact with the cam (*w*). This is effected by the sliding of the key (*z'*) through the slot near the end, as before described. If the stone is of a character to be dressed rapidly, then the full throw of the pawls is given, by carrying the lever (*y*) to the last notch of the plate (A); the vibration of the pawls being sufficient to take up several teeth on the ratchet wheel, at each throw of the cam, from which point the speed may be graduated down to a single tooth at each movement. By the position of the cams (*w*), it will be seen that after each crossing of the cutter wheels over the face of the stone, it is moved one degree farther, until its whole surface has passed under and the stage has reached the opposite side of the frame. The motion is now reversed, by disengaging the third notch in (B) and engaging the first; this engages the opposite pawl (*v*) with the ratchet wheel (*n'*) and of course immediately starts the stage back again.

By the operation just described, the stone has passed beneath the cutters in a horizontal line; and no mention has been made of the second set of pawls which act upon the platform (*g*) of the stage. In returning the stone a second time under the cutters, to be further reduced, it will be necessary that it should be raised; this can be effected by putting the wheel ($b^2$) in gear, and effecting the raising by hand to the proper height, or if the stone should be too heavy for that, it is only necessary to engage the pawls (*u*) or (*u'*) as may be required for raising or lowering through the medium of the slide (B') the whole operation being the same as that just described, for the pawls (*v v'*), the power of the driving engine being then exerted upon the stone. By various adjustments and combinations of movements of these pawls the stone upon the stage may be raising or lowering, while passing under the cutters, or remain stationary, so as to produce straight surfaces, or levels and curves. And these effects can be produced by the various adjustable combinations contained in the several moving parts, as described, so that from the variety of regulating parts the machine can be readily adapted to the advantageous workings of numerous and diverse qualities of materials.

Figs. 6 and 5, are details of the cutters and cutter frame, Fig. 5 is an end view of the frame and Fig. 6 is a cross section. This frame and cutters as before described play back and forth over the stone placed upon the stage, and it is now designed to show some adjustment it is capable of in its action upon the stone. At X Fig. 1 the position of the cutter in the machine is shown, and as there represented exhibits two wheels hung in the frame one in advance of the other, but the number of wheels can be advantageously increased, and at H Fig. 6, is shown the manner of doing it; that is by putting a number of wheels side by side with washers between upon one spindle.

The frame X in which they are placed, is hung upon centers as seen in Fig. 3 in such a manner that it can be made to revolve, a set screw at I holding it in any position of its revolution. The intention of this is seen in Fig. 6; there the frame X is canted over so as to bring the axis of the cutters to an angle with the face of the stone beneath them. Thus it will be seen that as the stone traverses along on the stage in the direction of the arrows, the cutters which move across its face at right angles to this motion will be made to act upon the part to be cut in such a manner that each one will take a deeper cut than the first one preceding it. In dressing the ends of the block of stone, the frame X is still further turned around until the wheels are made to act upon them in like manner.

In Fig. 7, is a view of some mechanism designed to take the place of the pawls and ratchet wheels and their system of movements. (*h h'*) are the same shafts shown in the other figures for driving the stage along; instead of moving them by the connecting wheels (*i i*) a shaft lying horizontally connects and turns them by the screw wheels shown. This shaft connects with another which extends to the main driving shaft. Instead of the cams (*w w'*) there are two quadrant shaped blocks (N, N,) fastened to the circular plate; as this plate turns round it brings the blocks N, N in contact with roller (*i*) causing it to revolve as it passes over the surfaces, and remain stationary in the intervening spaces. This roller turns the bevel wheels seen connected with the shafts and from these motion is given to the shafts (*h h'*). By causing the roller (*i*) to play near the center of the circular plate the motion is diminished or increased by moving it toward its circumference. The handle shown at (Z) operates as a clutch for changing the direction of revolution in the shaft.

What I claim as my invention and improvement and desire to secure by Letters Patent is—

The construction of the staging for carrying the stone, consisting of a movable platform capable of raising and lowering in combination with the frame for producing the reciprocating motions so that these several motions may be had singly or in movements variously combined, substantially in the manner and for the purposes described.

CHARLES WILSON.

Witnesses:
 THOMAS G. FRENCH,
 JAMES G. HUNT.